June 3, 1941. W. F. STREHLOW 2,244,225
LUBRICATING SYSTEM
Original Filed June 13, 1935

Inventor
W. F. Strehlow
by
Attorney

Patented June 3, 1941

2,244,225

UNITED STATES PATENT OFFICE 2,244,225

LUBRICATING SYSTEM

Walter F. Strehlow, Milwaukee, Wis., assignor to Allis-Chalmers Manufacturing Company, Milwaukee, Wis., a corporation of Delaware Original application June 13, 1935, Serial No. 26,352. Divided and this application August 3, 1936, Serial No. 93,955

3 Claims. (Cl. 184—11)

This invention relates to lubricating systems and is concerned more specifically with a system for lubricating driving gears for a power takeoff shaft on a tractor. This application is a division of application Serial No. 26,352, filed June 13, 1935, issued as Pat. No. 2,073,613, Conrad E. Frudden and Walter F. Strehlow, Motor vehicle.

It is an object of the invention to lubricate the driving gears for a pulley shaft, or other power takeoff shaft on a tractor, by transferring lubricant from the transmission housing of the tractor into a separate compartment containing said driving gears.

Another object of the invention is to circulate through the separate compartment containing the driving gears for the power takeoff shaft, a constant flow of lubricant and to maintain said lubricant within the compartment at such a level that it may not flow out at the opening through which the power takeoff shaft passes into the compartment.

Another object of the invention is to maintain the lubricant in the compartment for the driving gears of the power takeoff shaft, at the mentioned level irrespective of whether the transmission housing is filled with its normal amount of lubricant or with less than its normal amount.

Another object of the invention is to provide a simple, inexpensive and efficient lubricating system for the driving gears of a power takeoff shaft on a tractor.

These and other objects and advantages of the invention will be apparent from the following description. A clear conception of an embodiment of the invention and of the operation of a device constructed in accordance therewith may be had by referring to the drawing accompanying and forming a part of this specification.

Figure 1:
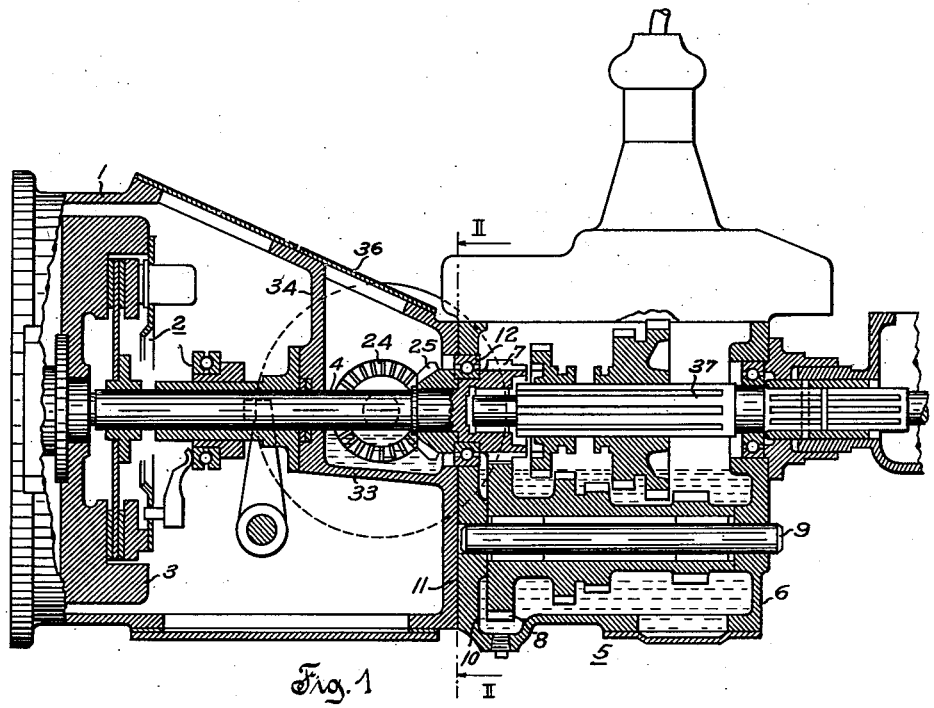
Fig. 1 is a vertical longitudinal sectional view of the clutch mechanism and speed change mechanism of a tractor.

The reference character 1 designates a housing which encloses the master clutch of the tractor, generally designated by the reference character 2, the master clutch serving to selectively connect and disconnect the flywheel 3 of the tractor motor and a shaft 4 which for reference purposes will be termed a power shaft. A speed change transmission mechanism of conventional design is generally designated by the reference character 5 and includes a housing 6 and a pair of permanently meshing spur gears 7 and 8, the spur gear 7 being an upper gear and integrally formed with the power shaft 4 at the rear end of the latter, and the spur gear 8 being a lower gear and journaled within the housing 6 on a countershaft 9. The spur gears 7 and 8 are arranged in the usual manner closely adjacent to the forward end wall of the transmission housing, and the interior space of the housing, at the side of the spur gears 7 and 8 remote from the forward end wall, extends from one side of a plane through the axes of shafts 4 and 9 to the other and accommodates the ordinary variable speed gears. The housing 6 of the speed change transmission mechanism is bolted or otherwise rigidly secured to the clutch housing 1, a vertical front wall 10 of the transmission housing 6 abutting against a vertical rear wall 11 of the clutch housing 1, as shown in Fig. 1. The forward end of the power shaft 4 is journaled in a pilot bearing in the flywheel 3, and the rearward end of the power shaft 4 is journaled in a ball bearing 12 partly seated in the front wall 10 of the transmission housing 6, and partly seated in the rear wall 11 of the clutch housing 1. The clutch housing is mounted on the tractor between frame channels 13 and 14, mounting lugs 15 and 16 of the clutch housing being fitted into the frame channels, and bolts 17 holding the frame channels and mounting lugs together, as more fully explained in the mentioned original application Serial No. 26,352, filed June 13, 1935.

A belt pulley shaft is indicated by the reference character 18 and is rotatably mounted in a sleeve 19 by means of a ball bearing 20 seated in the sleeve 19 at one end thereof and by means of a roller bearing 21 seated in the sleeve at the other end thereof. The outer race of the roller bearing 21 abuts against a shoulder of the sleeve 19 and is retained by a snap ring 22, and the outer race of the ball bearing 20 is similarly secured within the sleeve 19. The inner race of the ball bearing 20 is axially retained on the shaft 18 by a shoulder and a snap ring 23, and the shaft is thus prevented from axial displacement within the sleeve 19. A bevel gear 24 is integrally formed with the shaft 18 and meshes with a bevel gear 25 keyed to the power shaft 4, and a belt pulley 26 is secured to the outer end of the shaft 18 projecting from the sleeve 19. A suitable dust seal, not shown, may be mounted in the outer end of the sleeve 19 at the side of the roller bearing 21 facing the hub of the belt pulley 26. The inner end of the sleeve 19 is slidingly fitted into a bore of an internal web 27 of the clutch housing 1, the diameter of the bore corresponding within close limits to the outside diameter of the portion of the sleeve 19 seated in the bore. An intermediate portion of the sleeve 19 is slidingly fitted into a bore of the mounting lug 16 of the clutch housing, the channel 14 having an aperture registering with the bore in the lug 16. An oil seal 28, preferably in the form of a cork ring, is retained in a counter bore of the lug 16 by the web of channel 14, and an internal flange 29 projects inwardly from the sleeve 19. A portion of the sleeve intermediate the seats afforded by the bores in the web 27 and lug 16 is reduced in diameter and provided with a series of holes 30 and with an annular groove 31, the holes 30 being tapered to receive the tapered end of a set screw 32 which is screwed into a threaded hole of a wall portion of the clutch housing 1. The holes 30, groove 31 and set screw 32 serve to retain the sleeve 19 in the clutch housing 1 in a plurality of adjusted positions, as is more fully disclosed in a copending application Serial No. 94,016, filed August 3, 1936, Conrad E. Frudden, Pulley attachment for tractors.

Figure 2:
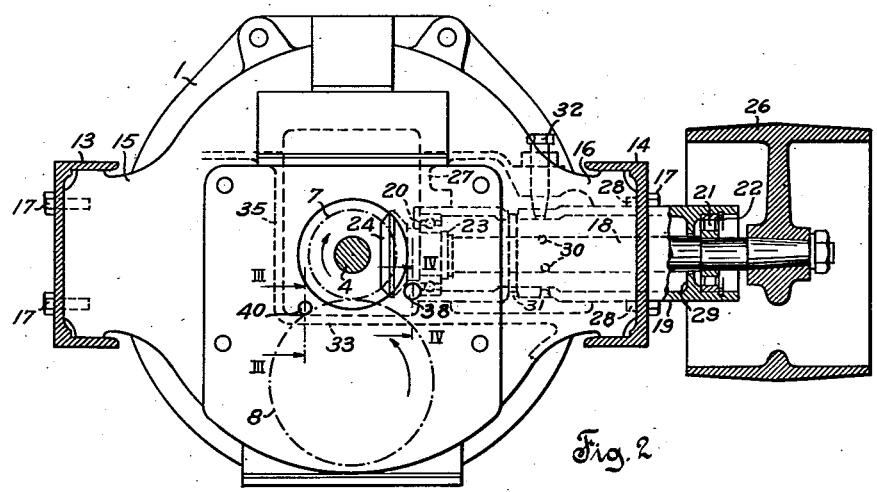
Fig. 2 is a view, partly in section, on the plane indicated by line II—II in Fig. 1.
Figure 4:
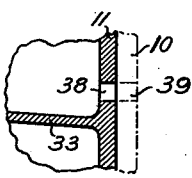
Fig. 4 is a sectional view on line IV—IV of Fig. 2.

The bevel gears 24 and 25 are enclosed in a gear compartment of the clutch housing 1, the compartment providing an oil basin for the bevel gears 24 and 25 and being formed by an inclined bottom wall 33, a vertical front wall 34, a vertical side wall 35, the web 27 and the upper part of the rear wall 11 of the clutch housing. The top of the gear compartment is closed by a cover 36. It is desirable that the oil level in the transmission housing 6 be kept below the variable speed shaft 37 of the speed change mechanism, approximately at the height indicated in Fig. 1, and, on the other hand, it is desirable to maintain an oil level in the gear compartment of the clutch housing at a height below the power shaft 4 and below the belt pulley shaft 18, the belt pulley shaft extending at right angles to the clutch shaft in a horizontal plane through the axis of the latter. The desired oil level in the gear compartment is indicated in Fig. 1 and is above the oil level in the transmission housing 6. When the engine of the tractor is running it rotates the power shaft 4, provided that the clutch mechanism 2 is engaged, and the lower gear 8 due to its mesh with the upper gear 7 will be rotated. The teeth of the lower gear 8, as they emerge from the oil in the transmission housing, are loaded with oil, the amount of oil clinging to the teeth of the gear being rather substantial because, according to usual practice, a relatively thick oil or heavy bodied lubricant is used in the transmission housing. Only a small portion of the oil which clings to the teeth of the lower gear 8 can pass the point of mesh of the gears 8 and 7, the remainder backing up ahead of the point of mesh and forming a spouting body of lubricant rising above the normal oil level which is indicated in Fig. 1, the spouting action being effective not only in the plane of the intermeshing gears but also causing diffusion of the oil transversely to said plane. This fact is utilized to circulate some of the lubricant contained in the transmission housing 6, through the gear compartment of the clutch housing 1 and to maintain lubricant in said gear compartment at the level indicated in Fig. 1. In Fig. 2 the pitch circles of the gears 7 and 8 are indicated in dash dotted lines, and the arrows in each circle indicate the directions in which the gears are rotated by the engine of the tractor. The rear wall 11 of the clutch housing has a hole 38 in it, and the front wall 10 of the transmission housing has a similar hole 39 in it concentric with the hole 38 in the rear wall of the clutch housing, as shown in Figs. 2 and 4. The center of the hole 38 is so located with respect to the pitch circles of the gears 7 and 8 that some of the lubricant which builds up near the relatively approaching teeth of the intermeshing gears, as mentioned above, is spouted through the hole 39 in the front wall of the transmission housing and through the hole 38 in the rear wall of the clutch housing into the gear compartment of the latter. While some of the lubricant which builds up ahead of the point of mesh of the gears 7 and 8 is diffused transversely of the gears towards the forward end wall of the transmission housing another portion of said lubricant is diffused transsversely of the gears in the opposite direction. This latter portion of the lubricant circulates through the space at the rear side of the gears 7 and 8 substantially without obstruction. It should be noted that the holes 38 and 39 are not directly below the axis of shaft 4 but positioned laterally of a vertical longitudinal plane through the axis of shaft 4, and above the pitch circle of the lower gear 8 in proximity to the latter and also in proximity to the pitch circle of the upper gear 7. At the point where the holes 38 and 39 are located, as shown in Fig. 2, the transverse spouting of the lubricant is sufficiently effective to transfer lubricant from the transmission housing into the gear compartment of the clutch housing, and the oil passing through the holes 38 and 39 is subject to a pressure which would be sufficient to raise the oil in the gear compartment to a level considerably higher than that indicated in Fig. 1. The counter spur gear 8 is freely exposed, at its circumference and at its side remote from the front wall 10, to the interior of the transmission housing 6. In other words, the counter spur gear 8 has an annular portion freely exposed to the interior of the transmission housing 6 and, being thus exposed, the counter spur gear 8 is incapable of direct cooperation with the transmission housing in the manner of a gear pump. Pressure upon the oil passing through the holes 39, 38 is produced by the direct coaction of the gears 7 and 8 with the lubricant, which causes the mentioned diffusion or spouting of the lubricant transversely of and in opposite directions from the plane of the gears 7 and 8.

Figure 3:
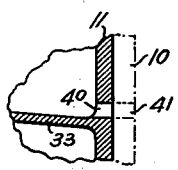
Fig. 3 is a sectional view on line III—III of Fig. 2.

The oil which enters the gear compartment of the clutch housing 1 through the holes 39, 38 is under appreciable pressure, as stated, and in order to prevent such oil from rising too high in the gear compartment and keep it as closely as possible at the level indicated in Fig. 1, an outlet hole 40 is drilled into the rear wall of the clutch housing 1 near the bottom wall 33 of the gear compartment, as shown in Figs. 2 and 3, and a similar hole 41 concentric with the hole 40 is drilled into the front wall 10 of the transmission housing 6. The inlet holes 38 and 39 and the outlet holes 40 and 41 are so positioned and proportioned that a circulation of lubricant therethrough takes place at the proper rate to maintain the oil level in the gear compartment, approximately at the height indicated in Fig. 1. As shown in Fig. 2, the outlet hole 40 in the rear wall of the clutch housing is located at the side of a vertical longitudinal plane through the shaft 4 where the teeth of the intermeshing gears 7 and 8 recede from each other, and as there is no back pressure at this side of the gears within the transmission housing the oil from the gear compartment will flow back into the transmission housing through the outlet hole 40 and through the hole 41 in the front wall of the transmission housing. The internal flange 29 of the sleeve 19 obstructs the flow of oil through the lower part of the sleeve, and the oil level in the gear compartment may therefore be kept close to the shaft 18; however, the oil level is kept low enough to prevent overflow between the lower side of shaft 18 and the flange 29, and consequent loss of oil through the roller bearing 21.

The transfer of oil from the transmission housing into the gear compartment by the pumping action of the gears 7 and 8 is independent of variations of the oil level in the transmission housing, within certain limits. The normal loss of oil from the transmission housing, which is incident to the operation of the tractor, causes a lowering of the oil level in the transmission housing, but it will not cause a lowering of the oil level in the gear compartment.

It should be noted that the lubricating system disclosed herein lends itself in a very simple manner to use in connection with a change speed transmission mechanism of standard construction and that it requires no change in such standard transmission mechanism except that the holes 39 and 41 are drilled into the front wall of the transmission housing at the proper places. It requires no parts in addition to those which are already present in the standard transmission mechanism and it involves practically no extra cost in the manufacture of the tractor.

It should be understood that it is not intended to limit the invention to the exact details of construction herein shown and described, for various modifications within the scope of the claims may occur to persons skilled in the art. For instance, the direction of rotation of the gears 7 and 8 could be reversed in which case the lubricant elevated by the gear 8 would be diffused transversely at the left side of the point of mesh of the gears 7 and 8 with reference to Fig. 2, and instead of entering the bevel gear compartment through the holes 38, 39, as described hereinbefore, the lubricant would enter the bevel gear compartment through the holes 40 and 41 and return into the transmission compartment through the holes 38 and 39. The holes 38 and 39 are located at a level below the power take-off shaft 18, and sufficient lubricant would accumulate in the bevel gear compartment to keep the lower portion of the bevel gears 24 and 25 immersed therein, but due to the overflow through the holes 38, 39, the lubricant could not rise to such a height that it would overflow at the flange 29 in the sleeve 19.

It is claimed and desired to secure by Letters Patent:

1. In a lubricating system, a housing containing intermeshing upper and lower gears adjacent to a wall portion thereof and having an interior space, at the side of said gears remote from said wall portion, extending from one side of a plane through the axes of said gears to the other, a compartment communicating with said housing through an inlet opening in said wall portion and through an outlet opening, and means requiring lubrication within said compartment including a positively driven rotatable element adapted to dip into lubricant accumulating within said compartment, said inlet opening being offset from the point of mesh of said gears towards the relatively approaching teeth thereof, whereby heavy bodied lubricant elevated by said lower gear and diffused transversely ahead of said point of mesh towards said wall portion will be transferred from said housing into said compartment through said inlet opening, while the portion of said lubricant diffused transversely of said gears in the opposite direction will circulate through said space substantially without obstruction.

2. In a motor vehicle having a horizontally disposed power shaft and a support therefor including a vertical wall element, the combination of a walled structure associated with said support providing a gear compartment around a portion of said power shaft at one side of said wall element adapted to contain lubricant, a power takeoff shaft rotatably mounted on said support and projecting into said gear compartment, means including a rotary element secured to said power shaft within said gear compartment for drivingly connecting said power shaft with said power takeoff shaft, a transmission housing adjacent to said wall element at the other side thereof adapted to contain lubricant, a driving spur gear within said transmission housing non-rotatably secured to said power shaft in axially fixed position adjacent to said wall element, a counter spur gear within said transmission housing below said driving spur gear and in constant mesh therewith, said counter spur gear having an annular portion freely exposed to the interior of said transmission housing, a variable speed shaft within said transmission housing, and means including said permanently meshing spur gears for selectively transmitting power at different speed ratios from said power shaft to said variable speed shaft, said gear compartment communicating with the interior of said transmission housing through an opening in said wall element offset from the point of mesh of said spur gears towards the relatively approaching teeth thereof and in proximity to said teeth, whereby heavy bodied lubricant elevated by said counter spur gear and diffused transversely ahead of said point of mesh towards said wall element will be transferred from said transmission housing into said gear compartment while the portion of said lubricant diffused transversely of said spur gears in the opposite direction will circulate substantially without obstruction within said transmission housing.

3. In a motor vehicle having a horizontally disposed power shaft and a support therefor including a vertical wall element, the combination of a walled structure associated with said support providing a gear compartment around a portion of said power shaft at one side of said wall element adapted to contain lubricant, a sleeve mounted in a side opening of said gear compartment in a horizontal position to extend transversely of said power shaft, a power takeoff shaft extending through said sleeve, antifriction bearings within said sleeve supporting said power takeoff shaft, a flange element within said sleeve arranged to obstruct flow of lubricant through the lower part of said sleeve, cooperating bevel gears respectively secured to said power shaft and said power takeoff shaft within said gear compartment to transmit rotation of said power shaft to said power takeoff shaft, a transmission housing adjacent to said wall element at the other side thereof adapted to contain lubricant, a driving spur gear within said transmission housing non-rotatably secured to said power shaft in axially fixed position adjacent to said wall element, a counter spur gear within said transmission housing below said driving spur gear and in constant mesh therewith, said counter spur gear having an annular portion freely exposed to the interior of said transmission housing, a variable speed shaft within said transmission housing, and means including said permanently meshing spur gears for selectively transmitting power at different speed ratios from said power shaft to said variable speed shaft, said gear compartment communicating with the interior of said transmission housing through an inlet opening in said wall element offset from the point of mesh of said spur gears towards the relatively approaching teeth thereof and in proximity to said teeth, whereby heavy bodied lubricant elevated by said counter spur gear and diffused transversely ahead of said point of mesh towards said wall element will be transferred from said transmission housing into said gear compartment while the portion of said lubricant diffused transversely of said spur gears in the opposite direction will circulate substantially without obstruction within said transmission housing, and said gear compartment communicating with the interior of said transmission housing through an outlet opening in said wall element arranged to prevent lubricant accumulating within said gear compartment from overflowing at said flange element.

WALTER F. STREHLOW.